(12) United States Patent
Chen (10) Patent No.: US 8,264,603 B2
(45) Date of Patent: Sep. 11, 2012

(54) FILM-MODE VIDEO STREAM HANDLING METHOD AND SYSTEM

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 529 days.

(21) Appl. No.: 12/509,591

(22) Filed: Jul. 27, 2009

(65) Prior Publication Data

US 2011/0019085 A1    Jan. 27, 2011

(51) Int. Cl.
  *H04N 7/01* (2006.01)
  *H04N 11/20* (2006.01)
(52) U.S. Cl. ......... 348/448; 348/441; 348/459; 348/700
(58) Field of Classification Search .......... 348/448–449, 348/441, 452, 459, 558, 700–702, 911, 97, 348/451, 458, 556, 722, 192–193, 184; *H04N 7/01, H04N 11/20*
See application file for complete search history.

(56) References Cited

U.S. PATENT DOCUMENTS

| 6,867,814 | B2 * | 3/2005 | Adams et al. | 348/448 |
|---|---|---|---|---|
| 7,142,246 | B2 * | 11/2006 | Chen et al. | 348/448 |
| 7,283,174 | B2 * | 10/2007 | Tokuhara et al. | 348/448 |
| 7,595,843 | B2 * | 9/2009 | Neuman et al. | 348/700 |
| 7,800,699 | B2 * | 9/2010 | White et al. | 348/700 |

* cited by examiner

*Primary Examiner* — Trang U Tran
(74) *Attorney, Agent, or Firm* — Su IP Consulting (57) ABSTRACT

One embodiment of the present invention sets forth a method for detecting a bad edit. The method includes receiving a 3:2 film-mode video signal comprising a sequence of video fields, for each of the sequence of video fields, determining a state for the each video field based on a first moving-pixel count for the each video field with respect to a previous same-parity video field for the each video field and a second moving-pixel count for a first immediately preceding field for the each video field with respect to a second previous same-parity field for the first immediately preceding field, and identifying the 3:2 film-mode video signal as a bad edit if a predetermined state transition has been detected in the sequence of video fields.

12 Claims, 6 Drawing Sheets

400 A computer program product

404 A computer readable medium 402
one or more instructions for receiving a video signal comprising a sequence of video fields;

for each of the sequence of video fields, one or more instructions for determining a state for the each video field based on a first moving-pixel count for the each video field with respect to a first previous same-parity video field for the each video field, a first combing-pixel count for the each video field with respect to a first immediately preceding video field for the each video field, a second moving-pixel count for the first immediately preceding video field with respect to a second previous same-parity video field for the first immediately preceding video field, and a second combing-pixel count for the first immediately preceding video field with respect to a second immediately preceding video field for the first immediately preceding video field; and/or one or more instructions for identifying the video signal as a 2:2 film-mode if a first predetermined state transition has been repetitively detected in the sequence of video fields.

Fig. 4

500 A computer program product

504 A computer readable medium 502
one or more instructions for receiving a 3:2 film-mode video signal comprising a sequence of video fields;

for each of the sequence of video fields, one or more instructions for determining a state for the each video field based on a first moving-pixel count for the each video field with respect to a previous same-parity video field for the each video field and a second moving-pixel count for a first immediately preceding field for the each video field with respect to a second previous same-parity field for the first immediately preceding field; and/or one or more instructions for identifying the 3:2 film-mode video signal as a bad edit if a predetermined state transition has been detected in the sequence of video fields.

Fig. 5

FILM-MODE VIDEO STREAM HANDLING METHOD AND SYSTEM

BACKGROUND OF THE INVENTION

1. Field of the Invention

The present invention generally relates to video processing, and more particularly to a film-mode video stream handling method and system.

2. Description of the Related Art

Unless otherwise indicated herein, the approaches described in this section are not prior art to the claims in this application and are not admitted to be prior art by inclusion in this section.

Moving picture video is typically recorded or encoded at a predetermined frame rate. For example, cinema films are typically recorded at one predetermined rate (e.g., 24 frames per second). On the other hand, a video broadcast for an interlaced television (such as a national television system committee (NTSC) television or a phase alternating line (PAL) television) is encoded at another predetermined rate (e.g., 60 video fields per second). For the cinema film to be properly displayed on the interlaced television, a conversion of the cinema film is required. To convert the video of the cinema film encoded in the predetermined frame rate to be in compliance with the interlaced television standard, a technique of dropping or repeating frames within a frame sequence is a viable option. Such technique includes a 3:2 pull down and a 2:2 pull down. The 3:2 pull down is for generating a patterned sequence of the frames starting with a 3-video field frame followed by a 2-video field frame or vice versa. Similarly, the 2:2 pull down is to prepare another patterned sequence of consecutive 2-video-field frames. The frames processed by the 3:2 pull down or the 2:2 pull down are categorized as film-mode video streams.

A hybrid video stream may include one or more film-mode video streams and one or more non-film-mode video streams. The film-mode video streams may be properly displayed on a non-interlaced display device, after having pairs of the video fields carrying the same frame in the hybrid video stream identified to minimize potential ragged transition artifacts. Meanwhile, certain spatial or temporal interpolation is also needed to properly display the non-film-mode video frames on the non-interlaced display device with minimal artifacts. Because the film-mode video streams and the non-film-mode video streams are processed differently, detecting and handling film-mode video streams in a hybrid video stream ensures the proper display of such a hybrid video stream.

In addition, a video stream may include one or more bad edits. A "bad edit" generally refers to a break of a pattern in the video stream. For example, by erroneously switching out of a 3:2 film-mode operating mode, incorrect video fields may be processed, possibly introducing additional transition artifacts at the time of display.

SUMMARY OF THE INVENTION

One embodiment of the present invention sets forth a method for detecting a bad edit. The method includes receiving a 3:2 film-mode video signal comprising a sequence of video fields, for each of the sequence of video fields, determining a state for the each video field based on a first moving-pixel count for the each video field with respect to a previous same-parity video field for the each video field and a second moving-pixel count for a first immediately preceding field for the each video field with respect to a second previous same-parity field for the first immediately preceding field, and identifying the 3:2 film-mode video signal as a bad edit if a predetermined state transition has been detected in the sequence of video fields.

At least one advantage of the present invention disclosed herein is to handle a film-mode video stream based on certain pixel information associated with the video fields while remaining in the film-mode operating mode even after having detected irregularities in the video stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
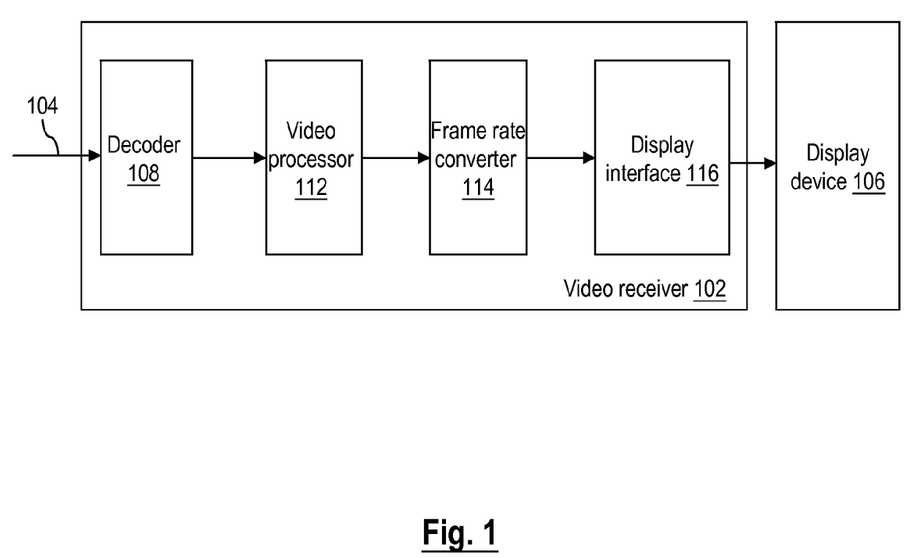
FIG. 1 is a simplified block diagram showing an example video receiver.

FIG. 1 is a simplified block diagram showing an example video receiver 102. The video receiver 102 receives a video stream 104 as a video source and connects to a display device 106. The video receiver 102 is configured to process the video stream 104 and to deliver the processed video stream to the display device 106. For the processing of the video stream 104, the video receiver 102 may include a decoder 108, a video processor 112, a frame rate converter 114, and a display interface 116. Some examples of the video receiver 102 may include, without limitation, a set top box (STB), a satellite receiver, or a media player (e.g., digital video disc (DVD) player).

The decoder 108 is configured to receive the video stream 104. The video stream 104 could be in the form of a video broadcast or a digital video stream. The decoder 108 is further configured to decode the received video stream 104 by parsing the received video stream 104 and forming a series of video fields or video frames associated with the received video stream 104. The series of the video fields or the video frames are provided to the video processor 112. The video processor 112 is configured to process the decoded video fields or video frames by scaling, de-interlacing, or otherwise manipulating the decoded video fields or video frames. Results of the processing may be transferred to the frame rate converter 114. The frame rate converter 114 may be configured to convert frame rate of the processed decoded video frames by interpolating adjacent video frames as a source in order to generate a video at a desired frame rate. The display interface 116 is configured to sample or receive the video of the desired frame rate generated by the frame rate converter 114. As such, the video of the desired frame rate is presented by the display interface 116 on the display device 106. Some examples of the display interface 116 may include, without limitation, a random access memory digital to analog converter (RAMDAC), a single ended or differential transmitter conforming to high definition multi-media interface (HDMI) standard, or any other suitable interface that converts data for display in analog or digital form on the display device 106.

Figure 2A:
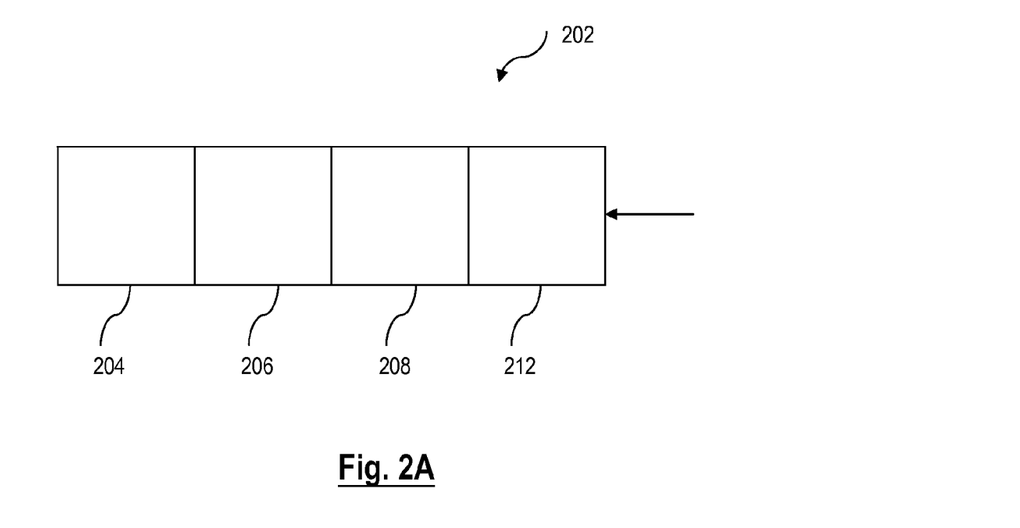
FIG. 2A is a schematic diagram illustrating an example video stream.

FIG. 2A is a schematic diagram illustrating an example video stream 202. The video stream 202 comprises a plurality of video frames 204, 206, 208, and 210. Each video frame may comprise one or more video fields. The video field contains one of many still images to be displayed sequentially to create the impression of a motion on a screen. The video stream 202 could be at a first frame rate (e.g., 24 frames per second).

Figure 2B:
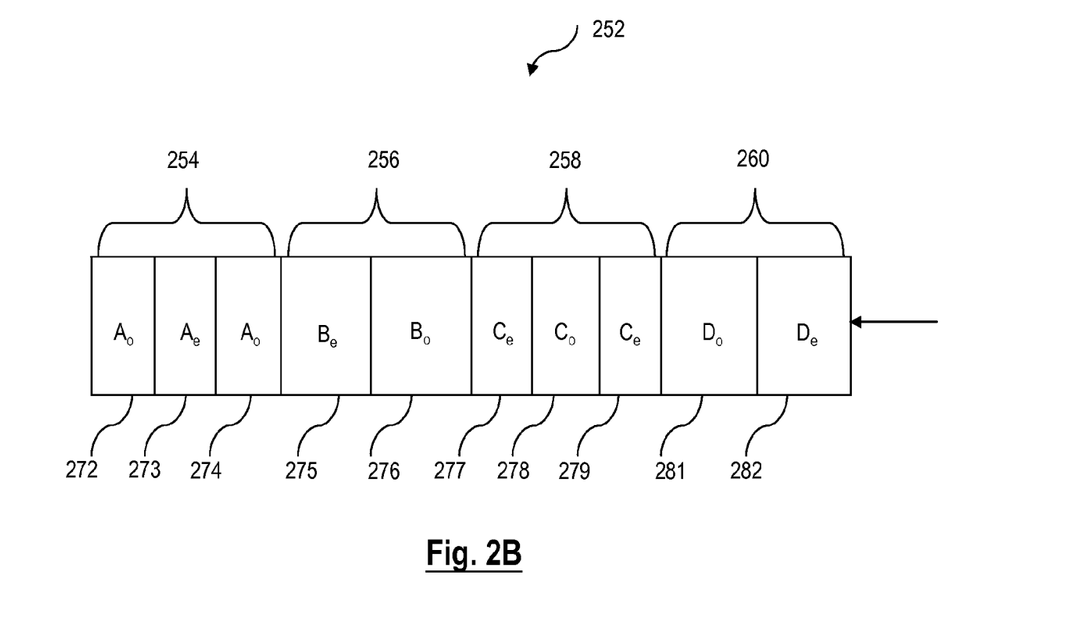
FIG. 2B is a schematic diagram illustrating an example 3:2 patterned video stream.

FIG. 2B is a schematic diagram illustrating an example 3:2 patterned video stream 252. The video stream 252 includes video frames 254, 256, 258, and 260. The 3:2 pull down process includes converting a first video frame (e.g., the video frame 254) into a video frame with three video fields 272, 273, and 274. The 3:2 pull down process further includes converting a second video frame (e.g., the video frame 256) that follows the first frame into a video frame having video field 275 and video field 276. In the first video frame 254, also the earliest received video frame in time in this example, the video field 272 and the video field 274 both contain odd-numbered lines of images (shown as $A_o$ in FIG. 2B), and the video field 273 contains even-numbered lines of images (shown as $A_e$ in FIG. 2B). In the second video frame 256, the video field 275 contains even-numbered lines of images (shown as $B_e$), and the video field 276 contains odd-numbered lines of images (shown as $B_o$). The second video frame 256 is followed by a third video frame (e.g., the video frame 258) having three video fields 277, 278, and 279. The video field 277 and the video field 279 both contain even-numbered lines of images (shown as $C_e$), and the video field 278 contains odd-numbered lines of images (shown as $C_o$). A fourth video frame (e.g., the video frame 260) following the third video frame 258 may have two video fields 281 and 282. The video field 281 contains odd-numbered lines of images (shown as $D_o$), and the video field 282 contains even-numbered lines of images (shown as $D_e$).

In the illustrated video stream 252, the video field 282 is considered the latest received video field relative to the other video fields in the video stream 252 in time. Throughout this disclosure, a "previous" video field or a "preceding" video field refers to a video field that is received earlier in time. A "succeeding" video field, on the other hand, refers to a video field that is received later in time. Thus, for example, the video field 277 is referred to as a "previous video field" to the video field 282. Similarly, the video field 281 is referred to as an "immediately preceding video field" to the video field 282. The video field 282 is referred to an "immediately succeeding video field" to the video field 281.

According to one embodiment of the present invention, each video field in the video stream is associated with a state, and detecting the 3:2 pattern in a video stream depends on the occurrence of certain state transitions. Specifically, in one implementation, a moving pixel count (MPC) and a previous moving pixel count (PMPC) associated with the video fields may be utilized to define the conditions for the state transitions. The MPC for a first video field refers to the number of moving pixels between the first video field and a first previously same-parity video field. For example, the MPC for the video field 282 (e.g., $D_e$) refers to the number of the moving pixels between the video field 282 and the video field 279 (e.g., $C_e$). Both the video field 282 and the video field 279 contain even-numbered lines of images. The PMPC for the same first video field refers to the number of moving pixels between a video field immediately preceding the first video field and a second previously same-parity video field. Continuing with the video field 282 example above, the PMPC for the video field 282 refers to the number of the moving pixels between the video field 281 (e.g., $D_o$), which is the video field immediately preceding the video field 282, and the video field 278 (e.g., $C_o$). Both the video field 281 and the video field 278 contain odd-numbered lines of images.

Figure 2C:
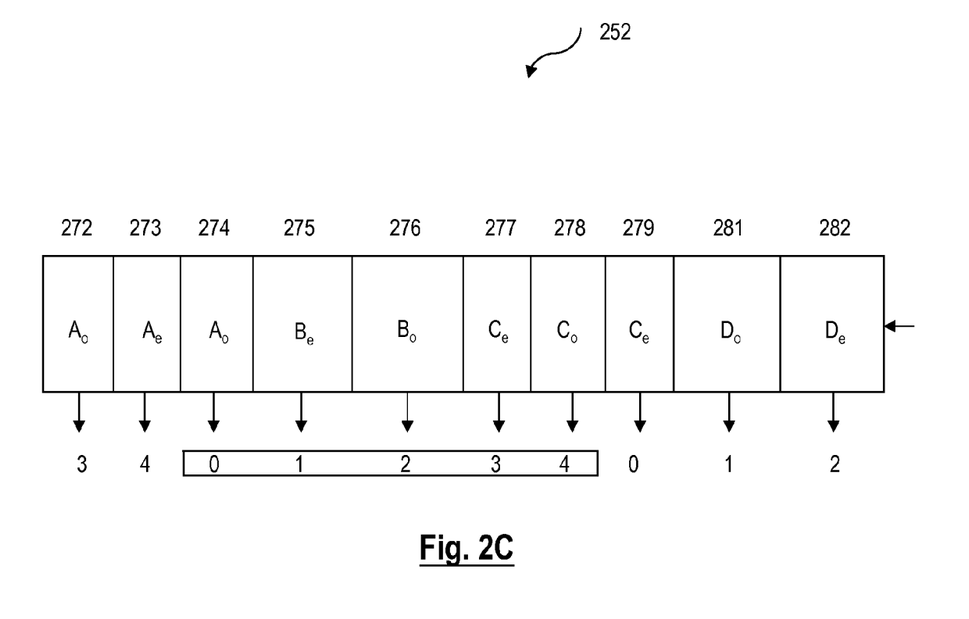
FIG. 2C is a schematic diagram illustrating example state transitions for a 3:2 patterned video stream, according to one embodiment of the present invention.

FIG. 2C is a schematic diagram illustrating example state transitions for a 3:2 patterned video stream, according to one embodiment of the present invention. Using the video stream 252 of FIG. 2B as an example, each of the video fields in the video stream 252 may correspond to a single state. In one implementation, there are five states (i.e., state 0, state 1, state 2, state 3, and state 4), and when the five states are detected in a first predetermined sequence, the 3:2 pattern is considered to have been identified. Before a state transition may take place, one or more conditions may need to be satisfied. One example set of conditions for the state transitions corresponding to the 3:2 pattern may be as follows:

a) state 0 to state 1 (MPC of state 1 ("MPC_1") is far greater than PMPC of state 1 ("PMPC_1"), and PMPC_1 is approaching zero);
b) state 1 to state 2 (MPC of state 2 ("MPC_2") is approximately equal to PMPC of state 2 ("PMPC_2"));
c) state 2 to state 3 (no specific condition is required);
d) state 3 to state 4 (MPC of state 4 ("MPC_4") is approximately equal to PMPC of state 4 ("PMPC_4")); and
e) state 4 to state 0 (PMPC of state 0 ("PMPC_0") is far greater than MPC of state 0 ("MPC_0"), and MPC_0 is approaching zero).

Referring back to FIG. 2B and FIG. 2C, state 0 may correspond to the video field 274, and state 1 may correspond to the video field 275. MPC_1 then refers to the number of moving pixels between the video field 275 and the video field 273, and PMPC_1 refers to the number of moving pixels between the video field 274 and the video field 272. In a 3:2 pattern, MPC_1 would be far greater than PMPC_1, because the video field 275 and the video field 273 belong to two different video frames (e.g., the video frame 256 and the video frame 254, respectively), and the video field 274 and the video field 272 belong to the same video frame (e.g., the video frame 254). In addition, PMPC_1 would approach zero, because the video field 272 and the video 274 contain the same parity line of images in the same video frame 254. The rationale discussed above for the conditions for the state transition from state 0 to state 1 is also applicable to the conditions for the state transition from state 4 to state 0.

In addition, MPC_2 refers to the number of moving pixels between the video field 276 and the video field 274 associated with a first parity (e.g., odd-numbered lines), and PMPC_2 refers to the number of moving pixels between the video field 275 and the video field 273 associated with a second parity (e.g., even-numbered lines). In a 3:2 pattern, MPC_2 and PMPC_2 would be approximately equal, because they both correspond to the differences of the two same video frames (e.g., the video frame 254 and the video frame 256). The rationale discussed above for the conditions for the state transition from state 1 to state 2 is also applicable to the conditions for the state transition from state 3 to state 4.

Figure 2D:
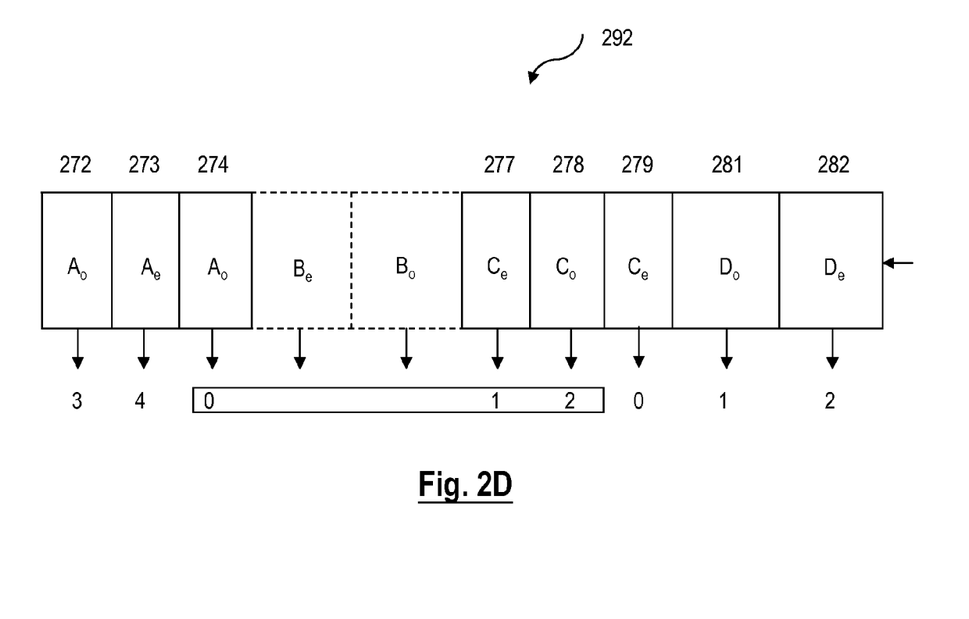
FIG. 2D is a schematic diagram illustrating example state transitions for a bad edit in a video signal, according to one embodiment of the present invention.

FIG. 2D is a schematic diagram illustrating example state transitions for a bad edit in a video signal, according to one embodiment of the present invention. Comparing to the 3:2 patterned video stream 252, two video fields are missing in a video stream 292. In one implementation, after having determined a 3:2 pattern video stream by identifying the first predetermined sequence of the state transitions, a second predetermined sequence of state transitions is utilized to detect the occurrence of the bad edit. One example set of conditions for the state transitions to detect the irregularity, or the bad edit, may be as follows:

a) state 0 to state 1 (MPC_1 is far greater than PMP_1 with PMPC_1 approaching zero);
    b) state 1 to state 2 or state 4 to state 2 (MPC_2 is approximately equal to PMPC_2);
    c) state 2 to state 0 (PMPC_0 is far greater than MPC_0 with MPC_0 approaching zero);
    d) state 2 to state 3 (when the conditions for the transition from state 2 to state 0 are not satisfied);
    e) state 0 to state 4 or state 3 to state 4 (MPC_4 is approximately equal to PMPC_4);
    f) state 4 to state 0 (PMPC_0 is far greater than MPC_0 with MPC_0 approaching zero); and
    g) state 5 as a dummy state to increment or decrement a film-mode counter when conditions a) to f) are not satisfied.

When an anticipated state transition from state 2 to state 3 fails to occur, and instead a state transition from state 2 to state 0 takes place, one possible irregularity in the 3:2 patterned video stream is indicated. In one implementation, this irregularity is detected, because PMPC_0 (i.e., the number of moving pixels between the video field 278 and the video field 274) is far greater than MPC_0 (i.e., the number of moving pixels between the video field 279 and video field 277). Since the video field 279 and the video field 277 belong to the same video frame 258 and have the same parity lines of images, MPC_0 is likely approaching zero.

When the anticipated state transition from state 0 to state 1 fails to occur, another possible irregularity in the 3:2 patterned video stream is indicated. Similarly, when the anticipated state transition from state 4 back to state 0 fails to occur, yet another possible irregularity in the 3:2 patterned video stream is indicated. By detecting such irregularities, in one implementation, a bad edit in the sequence of video fields may be determined.

In one implementation, state 5 may refer to a dummy state, which is associated with a film-mode counter. The value of the film-mode counter may be decremented by one for every entry into state 5. Conversely, the value of the film-mode counter may be decremented by one for every state transition that does not enter state 5. A video processor (such as the video processor 112) may track the value of the film-mode counter. In one implementation, when the value of the film-mode counter is greater than or equal to a predetermined threshold, the video processor may enter a film-mode operating mode. Generally, the larger the predetermined threshold value is, the more difficult it is to enter the film-mode operating mode. On the other hand, when the value of the film-mode counter falls below the predetermined threshold, the video processor may exit the film-mode operating mode. It is worth noting that the occurrences of one or more irregularities may not cause any state transition into state 5. In other words, despite having detected the bad edit, the video processor may continue operating in a 3:2 film-mode operating mode.

When the video stream is determined as having the 3:2 pattern, according to one embodiment of the present invention, de-interlacing for the video field in the video stream to generate a de-interlaced frame may be performed by copying content in either the video field immediately preceding or immediately succeeding in time to the video field of interest depending on the state that is associated with the video field of interest. For example, for the video field 275 in the video stream 252 that is associated with state 1, the de-interlacing for the video field 275 may be to copy the content in the video field immediately succeeding to the video field 275, such as the video field 276. The copied content is then combined with the video field of interest in the de-interlaced frame. On the other hand, when the bad edit is detected, instead of copying content in either the video field immediately preceding or immediately succeeding in time to the video field of interest depending on the state that is associated with the video field of interest, one implementation may be to perform spatial or temporal interpolation based on the video field of interest to generate the de-interlaced frame.

Figure 3A:
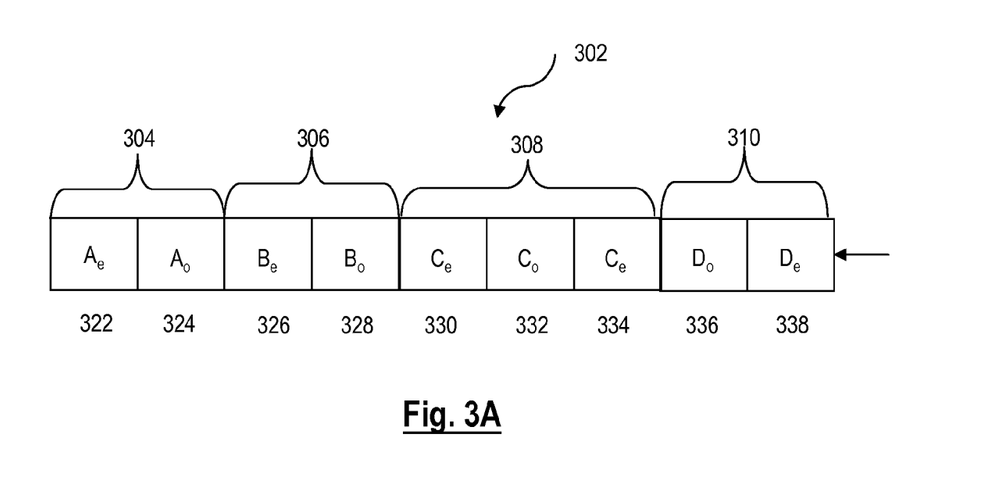
FIG. 3A is a schematic diagram illustrating a partial example 2:2:2:2:2:2:2:2:2:2:2:2:2:3 patterned video stream.

FIG. 3A is a schematic diagram illustrating a partial example 2:2:2:2:2:2:2:2:2:2:2:3 patterned video stream 302. Specifically, the video stream 302 may include 11 consecutive 2-video-field video frames followed by a 3-video-field video frame (e.g., a video frame 308). A video field 338 is the latest received video field in the video stream 302 in time, and a video frame 310 is the latest received video frame in the video stream 302 in time. Each video field in the video stream 302 contains either odd-numbered lines of images or even-numbered lines of images.

According to one embodiment of the present invention, detecting a certain pattern in the video stream 302 depends on the occurrence of certain state transitions. Specifically, in one implementation, a MPC, a PMPC, a combing pixel count (CPC), and a previous CPC (PCPC) associated with the video fields may be utilized to define the conditions for the state transitions. The definitions of the MPC and PMPC are the same as defined above. For example, the MPC for a video field 330 (e.g., $C_e$) refers to the number of the moving pixels between the video field 330 and a video field 326 (e.g., $B_e$). The PMPC for the same video field 330 refers to the number of the moving pixels between the video field 328 (e.g., $B_o$), which is the video field immediately preceding the video field 330, and the video field 324 (e.g., $A_o$). A CPC refers to a number of combing pixels between a first video field and a video field immediately preceding the first field. For example, the CPC for a video field 334 (e.g., $C_e$) refers to the number of the combing pixels between the video field 334 and a video field 332 (e.g., $C_o$). A PCPC refers to a number of combing pixels between the video field immediately preceding the same first video field (i.e., a first immediately preceding video field) and the video field immediately preceding the first immediately preceding video field. For the example, the PCPC for the same video field 334 refers to the number of combing pixels between the video field 332 (e.g., $C_o$) and the video field 330 (e.g., $C_e$).

In a 2:2 patterned video stream, the MPC and the PMPC for any video field in the video stream are likely to be large, since the number of the moving pixels is calculated between two video fields from two different frames. However, when a 3-video-field video frame, such as the video frame 308, occurs, the MPC and the PMPC may have unexpected results.

Figure 3B:
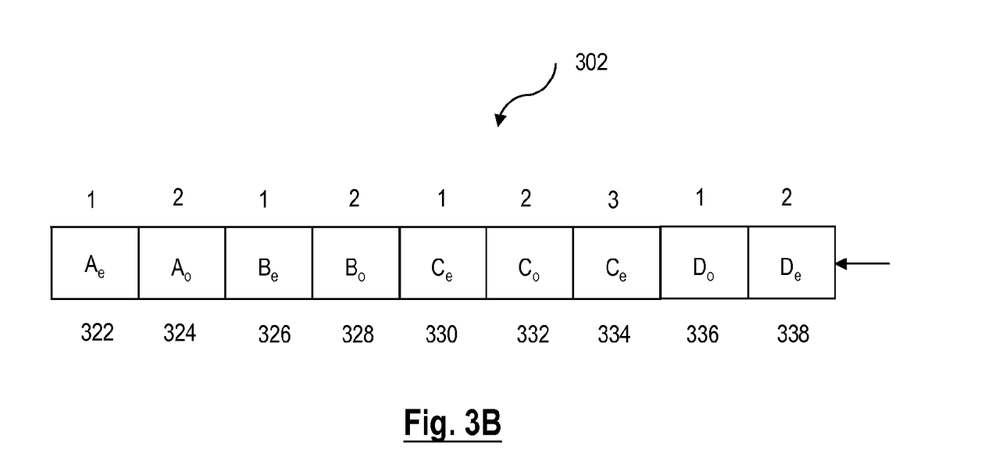
FIG. 3B is a schematic diagram illustrating example state transitions for a patterned video stream of FIG. 3A in a video signal, according to one embodiment of the present invention.

FIG. 3B is a schematic diagram illustrating example state transitions for a patterned video stream 302 of FIG. 3A in a video signal, according to one embodiment of the present invention. Using the video stream 302 as an example, each of the video fields in the video stream 302 may correspond to a single state. In one implementation, there are four states (i.e., state 0, state 1, state 2, and state 3). One example set of conditions for the state transitions to detect the irregularity in the sequence of video fields may be as follows:

a) state 1 to state 2 (CPC of state 2 ("CPC_2") is less than PCPC of state 2 ("PCPC_2") with CPC_2 less than a predetermined threshold);

b) state 2 to state 3 as an exception to a 2:2 patterned video stream (MPC of state 3 ("MPC_3") is much less than PMPC of state 3 ("PMPC_3"); MPC_3 is approximately 0; and an exception counter having a count of 11));

c) state 2 to state 1 or state 3 to 1 (CPC of state 1 ("CPC_1") is larger than PCPC of state 1 ("PCPC_1") with PCPC_1 less than a predetermined threshold); and d) state 0 as a dummy state to increment or decrement a film-mode counter when the conditions of a) to c) are not satisfied.

When the video frames in the video stream 302 only include two video fields, the state transitions occur between state 1 and state 2. In one implementation, the exception counter is incremented by one for every state transition from state 2 to state 1. The exception counter may be reset when the state transition from state 3 to state 1 occurs. When a state transition from state 2 to state 1 fails to occur and instead a state transition from state 2 to state 3 occur, this may indicate the presence of a 3-video-field video frame. If the exception counter also reaches the count of 11, then the 2:2:2:2:2:2:2:2:2:2:2:2:2:3 patterned video stream may have been detected. In one implementation, such a patterned video stream may be considered as a variety of the 2:2 patterned video stream, and the detection thereof may not cause the video processor to switch out of the operation of the 2:2 film-mode.

In one implementation, similar to the film-mode counter associated with state 5 as discussed above, the value of the film-mode counter may be decremented by one for every entry into state 0. On the other hand, when the state transition from state 2 to state 1 occurs, both the film-mode counter and the exception counter may be incremented. In an alternative implementation, the value of the film-mode counter may be incremented for every entry into state 0, and both the film-mode counter and the exception counter may be decremented for every state 2 to state 1 transition. When a sufficient number of state transitions from state 2 to state 1 have occurred (for example, 8 such state transitions), then the 2:2 film-mode may be considered to have been established. It is worth noting despite having detected the occurrence of the exception (i.e., the state transition from state 2 to state 3), the video processor may continue operating in the 2:2 film-mode operating mode.

When the video stream is determined as having the 2:2 pattern, according to one embodiment of the present invention, de-interlacing for the video field in the video stream to generate a de-interlaced frame may be performed by copying content in either the video field immediately preceding or immediately succeeding in time to the video field of interest depending on the state that is associated with the video field of interest. For example, for the video field 330 that is associated with state 1, the de-interlacing for the video field 330 may be to copy the content in the video field immediately succeeding to the video field 330, such as the video field 332. For the video field 332 that is associated with state 2, the de-interlacing for the video field 332 may be to copy the content in the video field immediately preceding the video field 332, such as the video 330. For the video field 334 that is associated with state 3, the de-interlacing for the video field 334 may be to copy the content in the video field immediately preceding the video field 334, such as the video field 332. The copied content is then combined with the video field of interest in the de-interlaced frame.

Figure 4:
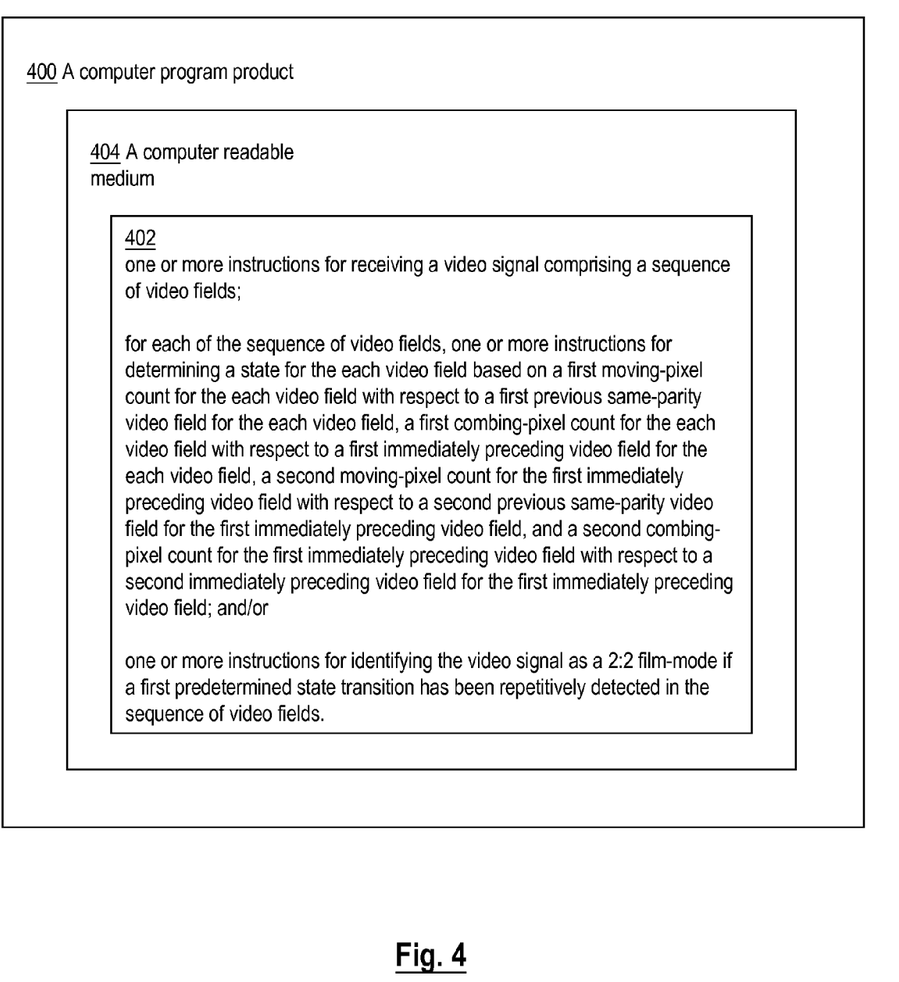
FIG. 4 is a schematic diagram showing an example computer program product configured to handle a video signal, according to one embodiment of the present invention.

FIG. 4 is a schematic diagram showing an example computer program product configured to handle a video signal, according to one embodiment of the present invention. Computer program product 400 includes one or more sets of instructions 402 for executing the method of handling a video signal according to one embodiment of the present invention.

Figure 5:
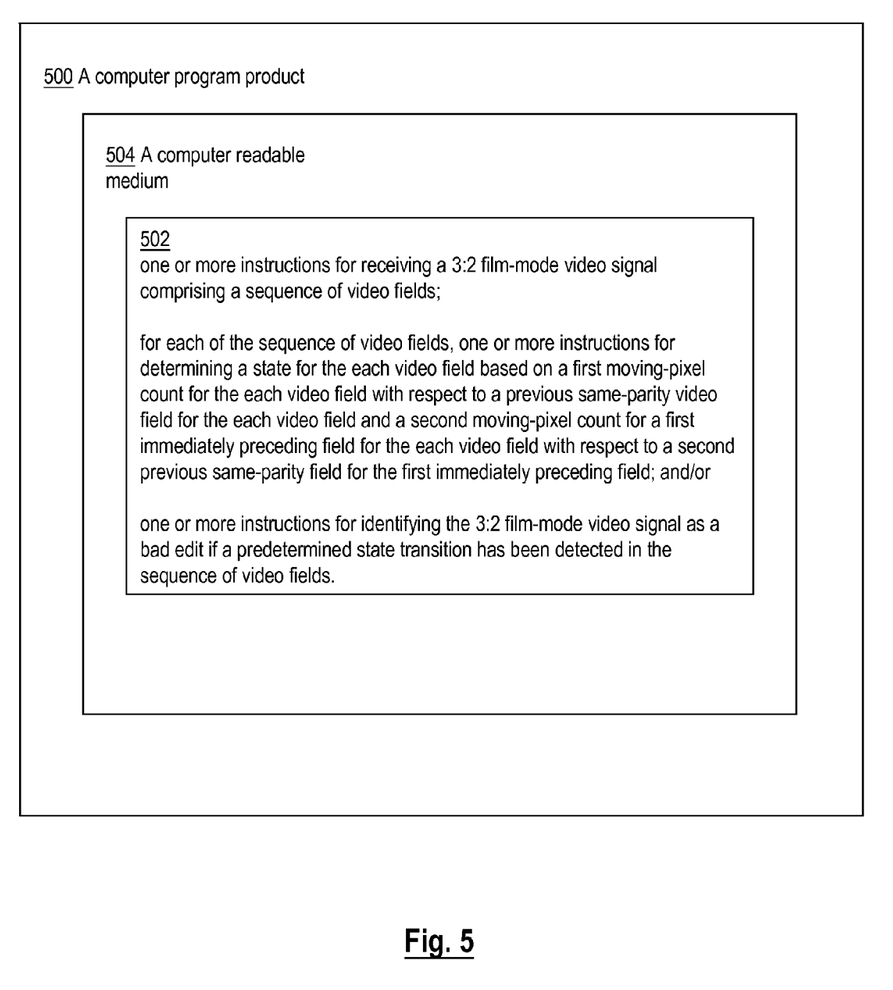
FIG. 5 is a schematic diagram showing another example computer program product configured to handle a video signal, according to one embodiment of the present invention.

FIG. 5 is a schematic diagram showing another example computer program product configured to handle a video signal, according to one embodiment of the present invention. Computer program product 500 also includes one or more sets of instructions 502 for executing the method of handling a video signal according to one embodiment of the present invention. Computer program product 400 and computer program product 500 may be recorded in a computer readable medium (e.g., computer readable medium 404 and computer readable medium 504, respectively). According to one embodiment of the present invention, the computer program product 400 and the computer program product 500 may be used with a video processing unit. Illustrative computer readable media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, solid state drive, flash memory, hard-disk drive, or any type of random-access memory) on which alterable information is stored.

The above examples, embodiments, instruction semantics, and drawings should not be deemed to be the only embodiments, and are presented to illustrate the flexibility and advantages of the present invention as defined by the following claims.

I claim:

1. A 2:2 film-mode detecting method, comprising:
receiving a video signal comprising a sequence of video fields;
for each of the sequence of video fields, determining a state for the each video field based on a first moving-pixel count for the each video field with respect to a first previous same-parity video field for the each video field, a first combing-pixel count for the each video field with respect to a first immediately preceding video field for the each video field, a second moving-pixel count for the first immediately preceding video field with respect to a second previous same-parity video field for the first immediately preceding video field, and a second combing-pixel count for the first immediately preceding video field with respect to a second immediately preceding video field for the first immediately preceding video field; and
identifying the video signal as a 2:2 film-mode if a first predetermined state transition has been repetitively detected in the sequence of video fields, wherein a state transition from a first state for one video field in the sequence of video fields to a second state for another video field in the sequence of video fields occurs when a condition involving one or more of a moving-pixel count and a combing-pixel count associated with the sequence of video fields is satisfied.

2. The method of claim 1, further comprise:
generating a de-interlaced frame corresponding to each of the sequence of video fields by combining the each video field and the first immediately preceding video field for the each video field or a first immediately succeeding video field for the each video field, based on the state of the each video field, when the video signal has been identified as the 2:2 film-mode.

3. The method of claim 1, further comprising:
generating a first de-interlaced frame corresponding to each of the sequence of video fields by combining the each video field and a first immediately succeeding video field for the each video field, if the state of the each video field indicates that the first combing-pixel count is larger than the second combing-pixel count; and
generating a second de-interlaced frame corresponding to each of the sequence of video fields by combining the each video field and the first immediately preceding video field for the each video field, if the state of the each video field indicates that the first combing-pixel count is smaller than the second combing-pixel count.

4. The method of claim 1, wherein the identifying step comprises:
detecting a second predetermined state transition corresponding to a variation to the 2:2 film mode in the sequence of video fields after having detected a consecutive number of the first predetermined state transitions.

5. The method of claim 4, further comprising:
generating a de-interlaced frame corresponding to each of the sequence of video fields by combining the each video field and the first immediately preceding video field for the each video field or a first immediately succeeding video field for the each video field, based on the state of the each video field, when the video signal has been identified as the 2:2 film-mode.

6. The method of claim 4, further comprising:
generating a first de-interlaced frame corresponding to each of the sequence of video fields by combining the each video field and a first immediately succeeding video field for the each video field, if the state of the each video field indicates that the first combing-pixel count is larger than the second combing-pixel count;
generating a second de-interlaced frame corresponding to each of the sequence of video fields by combining the each video field and the first immediately preceding video field for the each video field, if the state of the each video field indicates that the first combing-pixel count is smaller than the second combing-pixel count; and
generating a third de-interlaced frame corresponding to each of the sequence of video fields by combining the each video field and the first immediately preceding video field for the each video field, if the state of the each video field indicates that the first moving-pixel count is smaller than the second moving-pixel count, the first moving-pixel count is also approximately zero, and a second predetermined state transition has been detected.

7. A bad edit detecting method, comprising:
receiving a 3:2 film-mode video signal comprising a sequence of video fields;
for each of the sequence of video fields, determining a state for the each video field based on a first moving-pixel count for the each video field with respect to a previous same-parity video field for the each video field and a second moving-pixel count for a first immediately preceding field for the each video field with respect to a second previous same-parity field for the first immediately preceding field; and
identifying the 3:2 film-mode video signal as a bad edit if a predetermined state transition has been detected in the sequence of video fields, wherein a state transition from a first state for one video field in the sequence of video fields to a second state for another video field in the sequence of video fields occurs when a condition involving one or more moving-pixel counts associated with the sequence of video fields is satisfied.

8. The method of claim 7, further comprising:
generating a de-interlaced frame corresponding to each of the sequence of video fields using temporal and/or spatial interpolation, when the 3:2 film-mode video signal has been identified as the bad edit.

9. The method of claim 7, further comprising:
generating a de-interlaced frame corresponding to each of the sequence of video fields by combining the each video field and a first immediately succeeding video field for the each video field based on the state of the each video field, when the 3:2 film-mode video signal is not identified as the bad edit.

10. A non-transitory computer readable medium containing a sequence of instructions for detecting a bad edit, which when executed by a processing unit, causes the processing unit to:
receive a 3:2 film-mode video signal comprising a sequence of video fields;
for each of the sequence of video fields, determine a state for the each video field based on a first moving-pixel count for the each video field with respect to a previous same-parity video field for the each video field and a second moving-pixel count for a first immediately preceding field for the each video field with respect to a second previous same-parity field for the first immediately preceding field; and
identify the 3:2 film-mode video signal as a bad edit if a predetermined state transition has been detected in the sequence of video fields, wherein a state transition from a first state for one video field in the sequence of video fields to a second state for another video field in the sequence of video fields occurs when a condition involving one or more moving-pixel counts associated with the sequence of video fields is satisfied.

11. The non-transitory computer readable medium of claim 10, further comprising a sequence of instructions, which when executed by the processing unit, causes the processing unit to generate a de-interlaced frame corresponding to each of the sequence of video fields using temporal and/or spatial interpolation, when the 3:2 film-mode video signal has been identified as the bad edit.

12. The non-transitory computer readable medium of claim 10, further comprising a sequence of instructions, which when executed by the processing unit, causes the processing unit to generate a de-interlaced frame corresponding to each of the sequence of video fields by combining the each video field and a first immediately succeeding video field for the each video field based on the state of the each video field, when the 3:2 film-mode video signal is not identified as the bad edit.

* * * * *